Aug. 8, 1950   R. M. GASTON   2,517,653
PORTABLE SPOT WELDER
Filed May 3, 1949   4 Sheets-Sheet 1
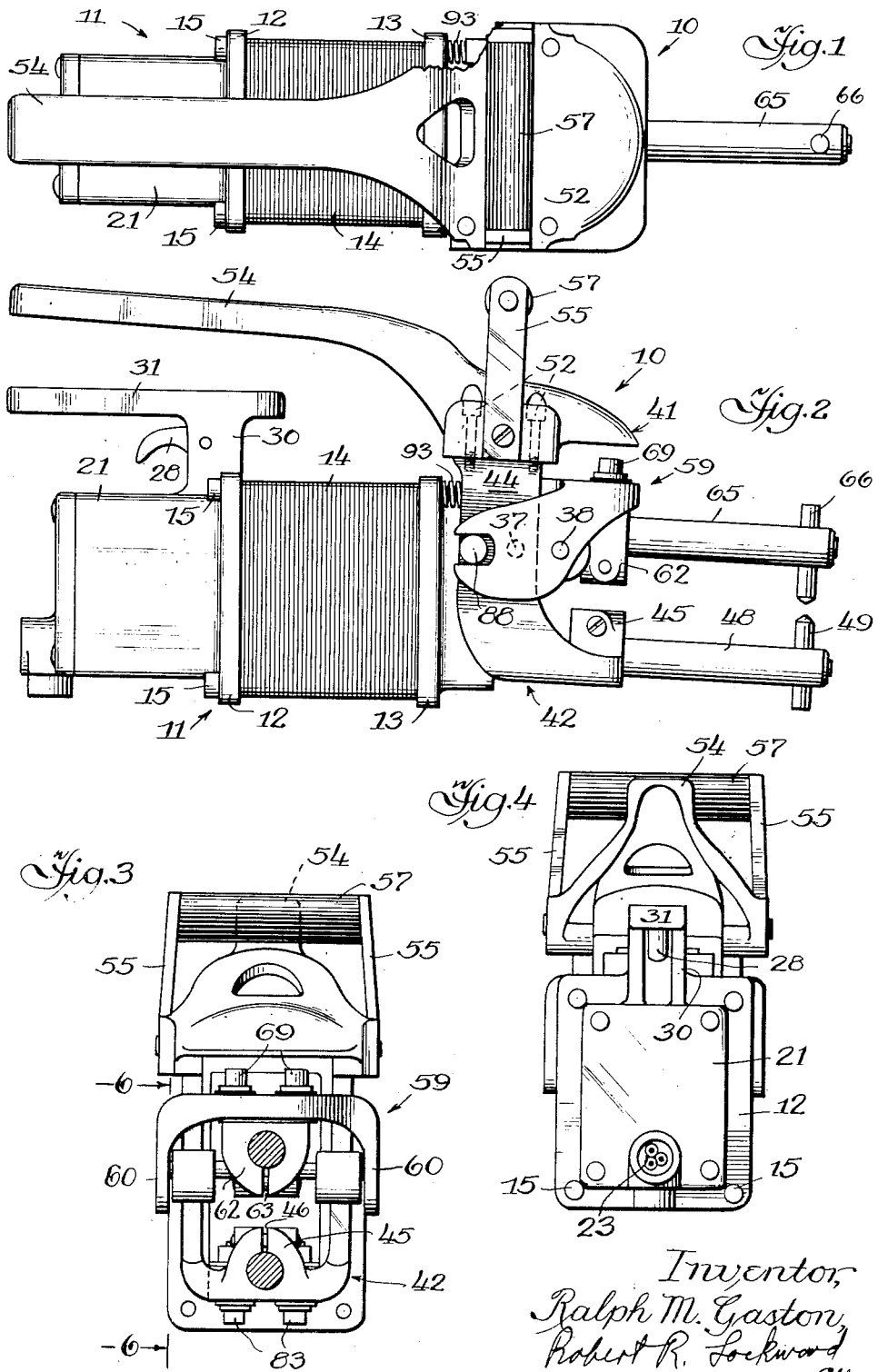
Inventor,
Ralph M. Gaston
Robert R. Lockward
Atty Inventor
Ralph M. Gaston
Robert R. Lockwood
Atty Aug. 8, 1950  R. M. GASTON  2,517,653
PORTABLE SPOT WELDER
Filed May 3, 1949  4 Sheets-Sheet 3
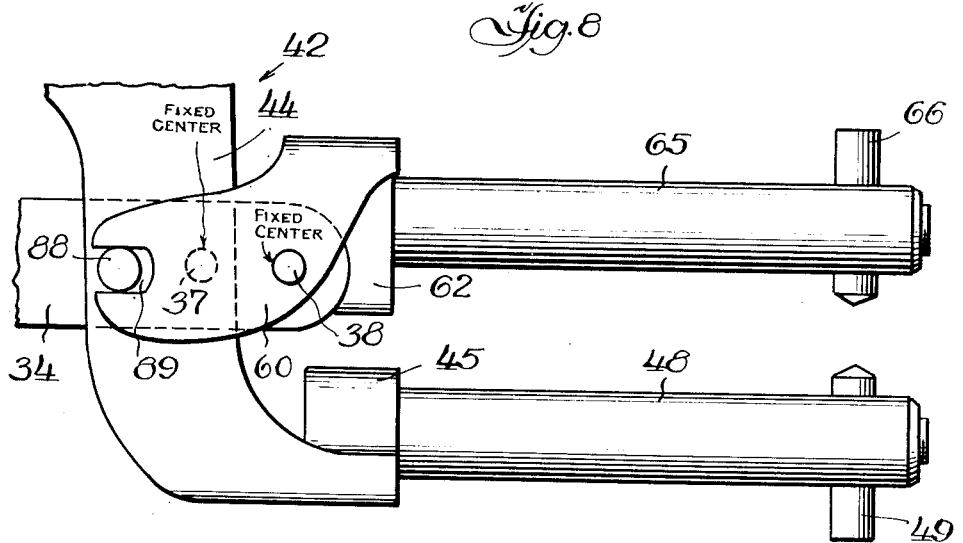
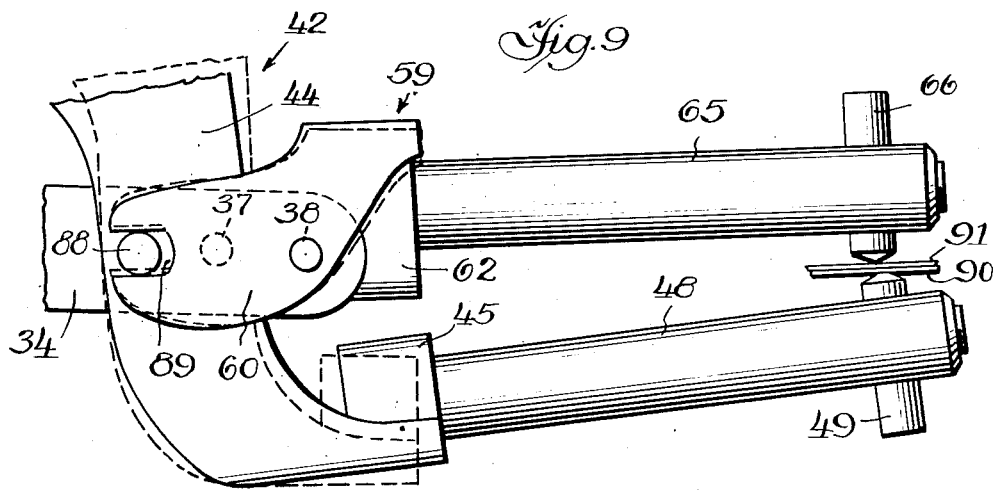
Inventor,
Ralph M. Gaston
Robert R. Lockwood
Atty.

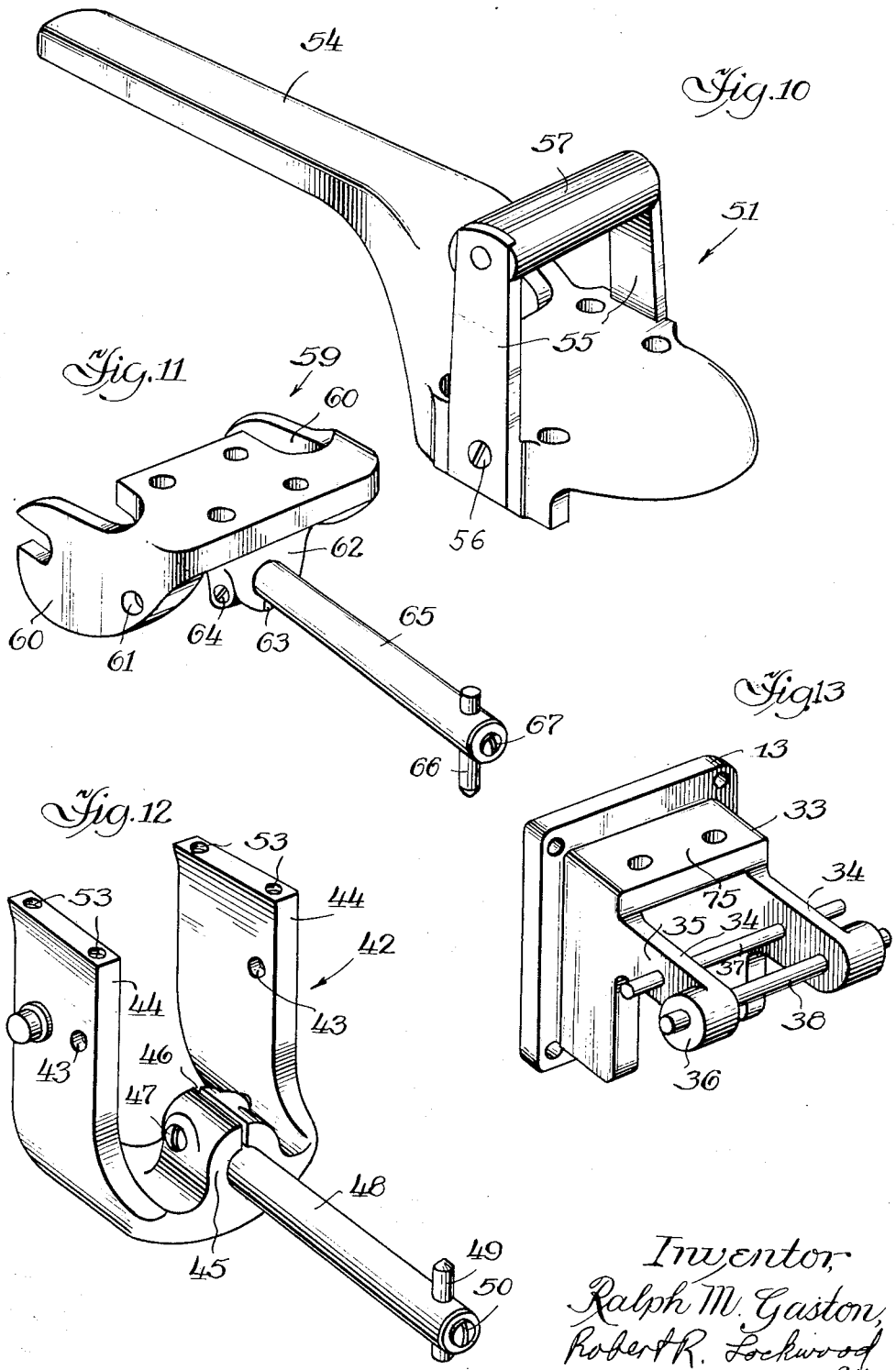

Patented Aug. 8, 1950

2,517,653

UNITED STATES PATENT OFFICE 2,517,653

PORTABLE SPOT WELDER

Ralph M. Gaston, Chicago, Ill., assignor, by mesne assignments, to Karma Manufacturing Company, Harvey, Ill., a corporation of Illinois Application May 3, 1949, Serial No. 91,097

12 Claims. (Cl. 219—4)

This invention relates, generally, to spot welders, and it has particular relation to portable spot welders which can be used in garages and automobile body repair shops for welding the thin sheet steel of automobile bodies and fenders. However, the use of this invention is not so limited. It may be used to perform other welding operations as will be understood readily.

Among the objects of this invention are: To provide for moving a pair of welding electrodes of a spot welder into and out of engagement with the work to be welded in a new and improved manner; to mount both electrodes for rocking movement and to rock them in the same direction at different speeds so that they move relatively toward or away from each other when one of them is moved; to interconnect the electrode mountings or holders so that, when one is rocked, its motion is translated into rocking movement of the other; to mount the electrode holders for rocking movement about individual axes which are spaced apart; to operate the electrode holders by means of levers attached thereto; to locate the axes of the electrode holders or levers and interconnect them in such manner as to multiply by several times the force applied to the levers so that the increased force is applied to the work between the welding electrodes; and to mount the levers on an assembly which includes a welding transformer that serves as a support for the two levers and also functions as one handle of a pair of handles, the other of which is an extension of one of the levers.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

Figure 1 is a top plan view of a portable spot welder in which the present invention is incorporated;

Figure 2 is a view, in side elevation, of the spot welder shown in Figure 1;

Figure 3 is a view in front elevation of the spot welder shown in Figure 2, the view showing the electrode holders in section;

Figure 4 is a view in rear elevation of the spot welder shown in Figure 2;

Figures 8 and 9 are enlarged views of the electrode holders and portions of the levers in different operating positions; and Figures 10, 11, 12, and 13 are perspective views of the levers and electrode holders and one of the end frames on which they are mounted.

Figure 5:
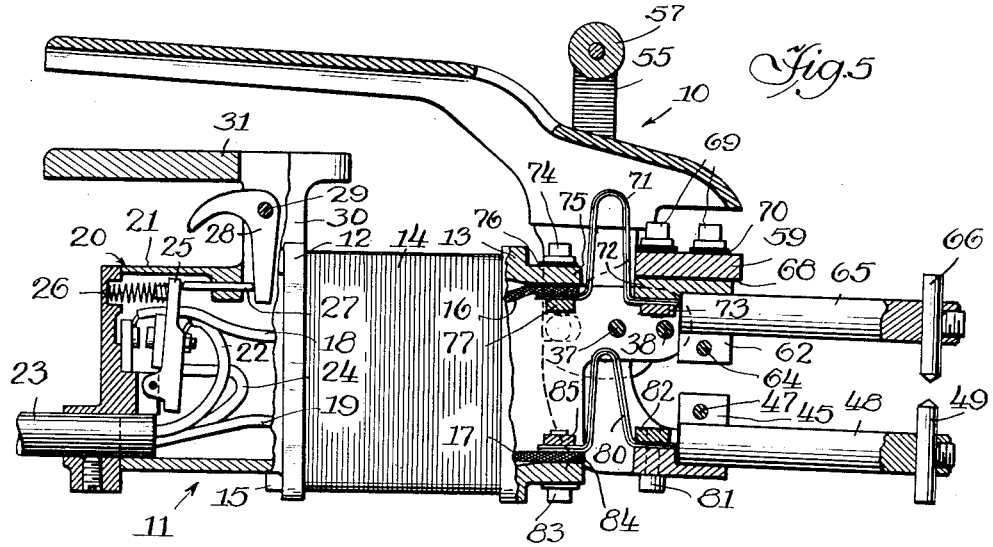
Figure 5 is a view, partly in side elevation and partly in longitudinal section, showing certain of the details of construction.
Figure 6:
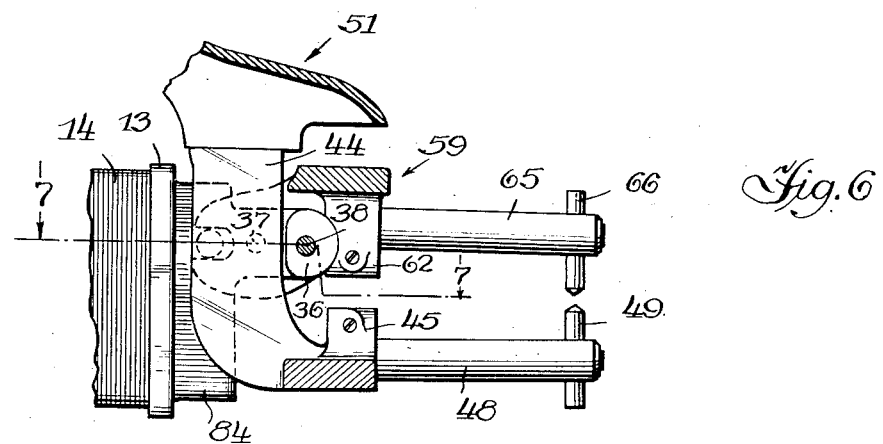
Figure 6 is a detail sectional view taken along the line 6—6 of Figure 3.

Referring now particularly to Figures 1, 2 and 5 of the drawings, it will be observed that the reference character 10 designates, generally, a portable spot welder which includes a transformer that is indicated, generally, at 11. The transformer 11 includes end frames 12 and 13 with a stack 14 of laminations therebetween. Suitable bolts 15 extend through the stack 14 of laminations between the end frames 12 and 13 for holding them in assembled relation. The transformer 11 includes a single turn secondary winding the ends of which are indicated at 16 and 17. Also it includes a primary winding having a number of turns corresponding to the voltage used and the ends of the primary winding are indicated at 18 and 19.

As illustrated in Figure 5 the end 18 of the primary winding is connected to a switch that is indicated, generally, at 20 and is located in a box-like extension 21 which is formed integrally with the end frame 12. The switch 20 is connected by a conductor 22 to a suitable source of current. It will be observed that the conductor 22 and the end of the primary winding 19 extend into a three conductor cable 23 which, it will be understood, is arranged to be connected to a suitable current source and to ground. A third conductor 24 is provided for grounding the spot welder 10 in order to avoid the application of any high voltage to the operator. The switch 20 includes an arm 25 which is biased to the switch open position by a coil compression spring 26. The switch may be closed by a pin 27 which is actuated by a trigger 28. It will be noted that the trigger 28 is pivotally mounted at 29 on an extension 30 that is formed integrally with the end frame 12. The trigger 28 is located underneath a hand hold 31 at the upper end of the extension 30 and formed integrally therewith.

Figure 7:
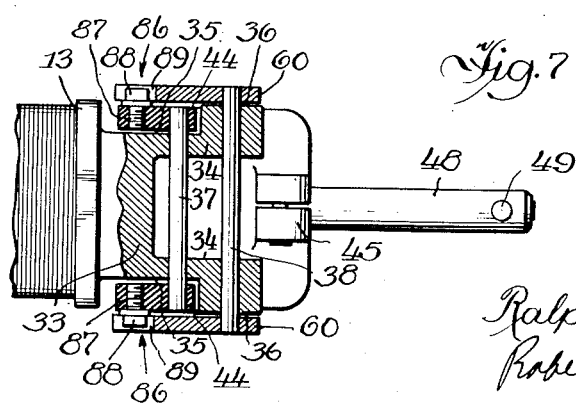
Figure 7 is a detail sectional view taken along the line 7—7 of Figure 6.

As illustrated more clearly in Figures 7 and 13 of the drawings, the end frame 13 has a laterally extending section 33 formed integrally therewith. The section 33 includes a pair of spaced arms 34 on the outer sides of which are oppositely disposed pairs of offset bearing surfaces 35 and 36. It will be noted that the bearing surfaces 35 are spaced nearer together than are the bearing surfaces 36 and that this provides the offset relationship just referred to. Also it will be noted that shafts 37 and 38 extend transversely through the pairs of bearing surfaces 35 and 36 respectively.

The shaft 37 is arranged to carry a generally O-shaped lever that is indicated, generally, at 41 in Figure 2 of the drawings. The O-shaped lever 41 includes a U-shaped lever, Figure 12, which is indicated, generally, at 42. It has openings 43 in its upstanding sides 44 for receiving the ends of the shaft 37. At its lower central portion the U-shaped lever 42 is provided with an integrally formed socket 45 which is longitudinally split at 46 and has a transversely extending clamp screw 47 for securing a rodlike electrode holder 48 therein. At its outer end the electrode holder 48 carries a transversely extending electrode 49 which may be held in position by a set screw 50 at the outer end of the electrode holder 48.

The O-shaped lever 41 also includes a handle member that is indicated, generally, at 51 in Figure 10 of the drawings. The handle member 51 may be secured by bolts 52, Figure 2, to the U-shaped lever 42. It will be understood that the bolts 52 are threaded into tapped holes 53 in the upper ends of the sides 44 of the U-shaped lever 42. The handle member 51 has a rearwardly extending arm 54 that projects over the transformer 11 and is generally parallel to the hand hold 31. It will be understood that the operator grips the arm 54 and the hand hold 31 with one hand and at the same time one of his fingers encircles the trigger 28 to operate the switch 20 for completing a circuit for energizing the primary winding of the transformer 11. Brackets 55 extend upwardly on opposite sides of the handle member 51, as shown in Figure 10, and they may be secured thereto by screws 56. A handle 57, preferably of wood, extends between the brackets 55 and is arranged to be gripped by the other hand of the operator. In this manner he can manipulate the spot welder 10 as may be desired.

The shaft 38, which it will be recalled extends through the bearing surfaces 36 on the outer sides of the arms 34, carries a generally C-shaped lever that is indicated, generally, at 59 in Figures 2 and 11 of the drawings. The generally C-shaped lever 59 has sides 60 which extend over the bearing surfaces 36 and which have openings 61 for receiving the ends of the shaft 38. The lever 59 carries a socket 62 which is split at 63 and has a clamp screw 64 for securing an electrode holder 65 therein. The electrode holder 65 may be similar to the electrode holder 48 and it may carry an electrode 66 at its outer end which may be held in place by a set screw 67.

It will be understood that the socket 62 is formed separately from the generally C-shaped lever 59 although it is carried thereby. It is insulated therefrom by a plate 68 of insulation that is illustrated in Figure 5. Suitable bolts 69 extend through the upper central portion of the C-shaped lever 59 and into the socket 62 for holding the same in position thereon. The bolts 69 are insulated from the C-shaped lever 59 by suitable insulating washers 70.

The socket 62 is connected to the end 16 of the secondary winding by a flexible conductor 71 which may be made up of a number of thin and flexible plates of copper. The conductor 71 is generally U-shaped, as shown, and one end is positioned underneath the rear portion of 72 of the socket 62 and is clamped thereto by the set of bolts 69 which extend through a clamp plate 73. The other end of the flexible conductor 71 is connected to the end 16 of the secondary winding by bolts 74 which extend through a top flange 75 of the laterally extending section 33. The bolts 74 are insulated from the flange 75 by suitable insulating washers 76 and they extend into a plate 77 for clamping the rear end of the flexible conductor 71 to the end of 16 of the secondary winding.

A similar arrangement, without the insulation, is provided for connecting the socket 45 to the other end 17 of the secondary winding. It will be observed that a flexible conductor 80, similar to the conductor 71, is provided and that the forward end of it is secured by bolts 81 to the socket 45. The bolts 81 extend through the socket 45 and into a clamp plate 82 for clamping the front end of the flexible conductor 80 therebetween. The rear end of the flexible conductor 80 is clamped by bolts 83 which extend through a bottom flange 84 of the laterally extending section 33 into a clamp plate 85. In accordance with this invention, provision is made for translating the movement of the generally O-shaped lever 41 to the generally C-shaped lever 59 in such manner that the electrode 49 moves faster than the electrode 66 so that, while they both move in the same direction, the former is brought into engagement with the work piece 90, Figure 9, while the electrode 66 is brought into engagement with the work piece 91. For this purpose knobs or detents, shown generally at 86 in Figure 7, are provided. Each knob or detent 86 includes a threaded section 87 which, as shown, is screwed into the corresponding side 44 of the U-shaped lever 42. Also each knob or detent 86 includes a cylindrical head 88 which projects into a U-shaped slot 89 at the end of each of the sides 60 of the C-shaped lever 59.

While the flexible conductors 71 and 80 may possess sufficient resiliency to bias the electrode holders 48 and 65 apart, it may be desirable to provide springs 93, Figures 1 and 2 of the drawings, to provide additional biasing force. As here shown, it will be noted that the springs 93 are interposed between the rear portions of the sides 44 of the U-shaped lever 42 and the forward surface of the end frame 13. It will be understood that the springs 93 may be located otherwise, for example, between the arm 54 and the hand hold 31 if desired.

Also it will be understood that different forms of electrode holder 48 and 65 can be used. These electrode holders can be provided with openings extending longitudinally from their outer ends for receiving various types of electrode extensions as may be desired. Also different lengths of electrode holders 48 and 65 can be employed as may be desired.

In describing the operation of the portable spot welder 10 disclosed herein, it will be assumed first that the electrode holders 48 and 65 are positioned so that the electrodes 49 and 66 are spaced apart as illustrated in Figure 8 of the drawings. Now the arm 54 is moved toward the handle 31 so that, as shown in Figure 9 of the drawings, the U-shaped lever 42 is swung from the position shown by the broken lines to its position shown by the full lines while the C-shaped lever 59 is moved from its position indicated by the broken lines to its position shown by the full lines. It will be recalled that the U-shaped lever 42, which forms a part of the O-shaped lever 41, pivots about the shaft 37 as an axis while the C-shaped lever 59 pivots about the shaft 38 as an axis. Now these levers are interconnected through the knobs or detents 86 and particularly by the engagement of the heads 88 with one side of each of the slots 89. The length of the work arm for the lever 42 is the distance between the center of the shaft 37 and the center of the cylindrical head 88. This distance is less, one half as shown in the drawing, than the length of the power arm for the lever 59 which is the distance between the center of the shaft 38 and the cylindrical head 88. Thus, as illustrated in Figure 9, for a given movement of the U-shaped lever 42, the C-shaped lever 59 moves only through one half the same distance and, while the electrodes 66 and 49 both are moved in the same direction, since the latter moves at twice the speed that the former does, they are caused to engage the work pieces 90 and 91 as illustrated. Also because of the particular lever ratios involved, it is possible to exert a relatively great force between the electrodes 49 and 66 which, of course, is transmitted to the work pieces 90 and 91. In the particular embodiment of the invention illustrated there is a one to six lever ratio. That is, with a fifty pound force applied to the arm 54 a pressure of three hundred pounds is exerted between the electrodes 49 and 66.

When the work pieces 90 and 91 have been gripped as described, the operator depresses the trigger 28 to close the switch 29 and complete the circuit for energizing the primary winding of the welding transformer 11. In the particular construction disclosed, it is possible to obtain a welding current of the order of 2500 amperes. This has been found sufficient to perform satisfactory welding operations on relatively light gauge metal.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a manually operable spot welder, in combination, a support member having a laterally extending section provided with offset bearing faces, a pair of electrode holders adapted to carry welding electrodes to engage work to be welded, levers carrying said electrode holders and independently pivoted on said offset bearing faces, and detent means interconnecting said levers whereby when one is rocked about its pivot in one direction the other is rocked about its pivot in the same direction but through a different angular extent to effect movement of said welding electrodes toward or away from each other depending on the direction of movement.

2. In a manually operable spot welder, in combination, a support member having a laterally extending section provided with offset bearing faces, a pair of electrode holders adapted to carry welding electrodes to engage work to be welded, levers carrying said electrode holders and independently pivoted on said offset bearing faces, a knob on one of said levers, and a cooperating socket on the other of said levers whereby when one is rocked about its pivot in one direction the other is rocked about its pivot in the same direction but through a different angular extent to effect movement of said welding electrodes toward or away from each other depending on the direction of movement.

3. In a manually operable spot welder, in combination, a support member having a laterally extending section provided with oppositely disposed pairs of offset bearing faces on opposite sides, a pair of electrode holders adapted to carry welding electrodes to engage work to be welded, levers carrying said electrode holders and independently pivoted on each pair of oppositely disposed bearing faces, and detent means on opposite sides of said section interconnecting said levers whereby when one is rocked about its pivot in one direction the other is rocked about its pivot in the same direction but through a different angular extent to effect movement of said welding electrodes toward or away from each other depending on the direction of movement.

4. In a manually operable spot welder, in combination, a support member having a laterally extending section provided with oppositely disposed pairs of offset bearing faces on opposite sides, a pair of electrode holders adapted to carry welding electrodes to engage work to be welded, levers carrying said electrode holders and independently pivoted on each pair of oppositely disposed bearing faces, knobs on one of said levers on opposite sides of said section, and cooperating sockets on the other of said levers whereby when one is rocked about its pivot in one direction the other is rocked about its pivot in the same direction but through a different angular extent to effect movement of said welding electrodes toward or away from each other depending on the direction of movement.

5. In a manually operable spot welder, in combination, a support member having a laterally extending section provided with oppositely disposed pairs of offset bearing faces on opposite sides, a pair of electrode holders adapted to carry welding electrodes to engage work to be welded, levers carrying said electrode holders, one lever being generally O-shaped and pivoted on the inner pair of oppositely disposed bearing faces, the other lever being generally C-shaped and pivoted on the outer pair of oppositely disposed bearing faces, knobs on one of said levers on opposite sides of said section, and cooperating sockets on the other of said levers whereby when one is rocked about its pivot in one direction the other is rocked about its pivot in the same direction but through a different angular extent to effect movement of said welding electrodes toward or away from each other depending on the direction of movement.

6. The invention, as set forth in claim 5, wherein the knobs project outwardly from the O-shaped lever and the cooperating sockets are located in the ends of the arms of the C-shaped lever.

7. In a manually operable spot welder, in combination, a support member, a pair of electrode holders adapted to carry welding electrodes to engage work to be welded, levers carrying said electrode holders and independently pivoted on said support member, and detent means interconnecting said levers whereby when one is rocked about its pivot in one direction the other is rocked about its pivot in the same direction but through a different angular extent to effect movement of said welding electrodes toward or away from 8. In a manually operable spot welder, in combination, a support member, a pair of electrode holders adapted to carry welding electrodes to engage work to be welded, levers carrying said electrode holders and independently pivoted on said support member, a knob on one of said levers, and a cooperating slotted socket on the other of said levers whereby when one is rocked about its pivot in one direction the other is rocked about its pivot in the same direction but through a different angular extent to effect movement of said welding electrodes toward or away from each other depending on the direction of movement.

9. In a manually operable spot welder, in combination; a transformer including a stack of laminations, primary and secondary windings thereon, and a frame at each end of said stack; a handle carried by one end frame and extending longitudinally of said transformer, a laterally extending section carried by the other end frame; a pair of electrode holders adapted to carry welding electrodes to engage work to be welded and connected to be energized from said secondary winding, levers carrying said electrode holders and independently pivoted on said section, detent means interconnecting said levers, and a handle extending from one of said levers along the first mentioned handle whereby when said handles are moved toward each other said welding electrodes are moved toward each other and vice versa.

10. In a manually operable spot welder, in combination; a transformer including a stack of laminations, primary and secondary windings thereon, and a frame at each end of said stack; a handle carried by one end frame and extending longitudinally of said transformer, a laterally extending section carried by the other end frame, a pair of electrode holders adapted to carry welding electrodes to engage work to be welded, flexible connections between said electrode holders and said secondary winding, levers carrying said electrode holders and independently pivoted on said section, detent means interconnecting said levers, and a handle extending from one of said levers along the first mentioned handle whereby when said handles are moved toward each other said welding electrodes are moved toward each other and vice versa.

11. In a manually operable spot welder, in combination; a transformer including a stack of laminations, primary and secondary windings thereon, and a frame at each end of said stack; a handle carried by one end frame and extending longitudinally of said transformer, a laterally extending section carried by the other end frame, a pair of electrode holders adapted to carry welding electrodes to engage work to be welded and connected to be energized from said secondary winding, levers carrying said electrode holders and independently pivoted on said section, detent means interconnecting said levers, a handle extending from one of said levers along the first mentioned handle whereby when said handles are moved toward each other said welding electrodes are moved toward each other and vice versa, and a hand grip on the second mentioned handle which may be gripped by one hand of an operator while his other hand grips said handles.

12. In a manually operable spot welder, in combination; a transformer including a stack of laminations, primary and secondary windings thereon, and a frame at each end of said stack; a handle carried by one end frame and extending longitudinally of said transformer, a laterally extending section carried by the other end frame, a pair of electrode holders adapted to carry welding electrodes to engage work to be welded and connected to be energized from said secondary winding, levers carrying said electrode holders and independently pivoted on said section, detent means interconnecting said levers, a handle extending from one of said levers along the first mentioned handle whereby when said handles are moved toward each other said welding electrodes are moved toward each other and vice versa, and spring means cooperating with one of said levers and acting to bias said welding electrodes apart.

RALPH M. GASTON.

REFERENCES CITED

The following references are of record in the file of this patent:

UNITED STATES PATENTS

| Number | Name | Date |
| --- | --- | --- |
| 2,190,692 | Bitter et al. | Feb. 20, 1940 |
| 2,267,297 | Campbell | Dec. 23, 1941 |